(12) United States Patent
McDermott

(10) Patent No.: US 10,111,292 B2
(45) Date of Patent: Oct. 23, 2018

(54) CROWD CONTROL LIGHTING SYSTEM

(71) Applicant: Kevin McDermott, Rockledge, FL (US)

(72) Inventor: Kevin McDermott, Rockledge, FL (US)

( * ) Notice: Subject to any disclaimer, the term of this patent is extended or adjusted under 35 U.S.C. 154(b) by 0 days.

(21) Appl. No.: 14/803,562

(22) Filed: Jul. 20, 2015

(65) Prior Publication Data

US 2017/0027035 A1    Jan. 26, 2017

(51) Int. Cl.
| | | |
|---|---|---|
| F21L 4/02 | (2006.01) | |
| H05B 33/08 | (2006.01) | |
| F21S 9/02 | (2006.01) | |
| F21V 23/04 | (2006.01) | |
| H05B 37/02 | (2006.01) | |
| B60Q 1/26 | (2006.01) | |
| F21L 4/00 | (2006.01) | |
| F21S 2/00 | (2016.01) | |
| F21S 10/06 | (2006.01) | |
| F21Y 115/10 | (2016.01) | |

(52) U.S. Cl.
CPC ............ *H05B 33/0845* (2013.01); *B60Q 1/26* (2013.01); *F21L 4/00* (2013.01); *F21S 2/00* (2013.01); *F21S 9/022* (2013.01); *F21S 10/06* (2013.01); *F21V 23/0407* (2013.01); *F21V 23/0435* (2013.01); *H05B 37/0272* (2013.01); *F21Y 2115/10* (2016.08)

(58) Field of Classification Search
CPC .............................. H05B 33/0845; F21S 9/022
See application file for complete search history.

(56) References Cited

U.S. PATENT DOCUMENTS

| | | | | |
|---|---|---|---|---|
| 3,732,412 | A * | 5/1973 | Tyroler | F41H 13/0087 362/293 |
| 6,190,022 | B1 * | 2/2001 | Tocci | F21L 11/00 362/184 |
| 2005/0185403 | A1 * | 8/2005 | Diehl | F41H 13/0081 362/259 |
| 2008/0002395 | A1 * | 1/2008 | Eisenberg | F41H 13/0087 362/109 |
| 2008/0013311 | A1 * | 1/2008 | Rubtsov | H05B 33/0857 362/231 |
| 2009/0284957 | A1 * | 11/2009 | Shemwell | F41H 13/0087 362/109 |

* cited by examiner

*Primary Examiner* — Evan Dzierzynski
(74) *Attorney, Agent, or Firm* — Hauptman Ham, LLP

(57) ABSTRACT

A crowd control lighting system includes a plurality of light emitting diode (LED) lights. Each light is configured to emit a flashing directional light beam to at least partially overlap and illuminate a common illumination zone. The common illumination zone is selectable from a plurality of illumination zones and is exterior to a dark zone not illuminated by the plurality of lights.

25 Claims, 6 Drawing Sheets

50

20

CROWD CONTROL LIGHTING SYSTEM

BACKGROUND

Law enforcement is frequently confronted with crowds composed of both law-abiding citizens and dangerous criminals. In these situations law enforcement needs to protect itself against those in the crowd wishing to cause harm without harming those who are merely present.

A typical law enforcement response to this situation is to illuminate the crowd with high intensity incandescent spot lights. This response is beneficial; however, it does not effectively degrade the visibility of the criminal element within the crowd. In addition, its effect can be overcome with sunglasses or shielding of the eyes. High intensity lights alone do not do enough to encourage the crowd to disperse.

Some high intensity incandescent lights for crowd control employ spot beams to assure maximum intensity; however, this is problematic for crowd control because the crowd can easily move such that it is not illuminated.

Some high intensity incandescent lights employed for crowd control are on special vehicles because the individual lights require large amounts of power. This limitation creates a logistics problem because the special vehicle is not always at the required location.

Crowds can easily move or shift such that they are no longer illuminated by the incandescent lights. Crowd movement would force law enforcement to reposition the special vehicles in order to maintain illumination; however, repositioning vehicles to follow crowd movement is not practical.

Some high intensity incandescent lights which continuously illuminate or which glow for a period of time after being turned off make it hazardous for law-enforcement within or adjacent to the vehicles because criminal elements within the crowd can shoot at the lights potentially hitting officers within the vicinity of the lights.

Some high-intensity lights are not directional such that they illuminate all persons in the vicinity of a crowd providing equal illumination of the crowd and law-enforcement.

Some high intensity steady lights lose their effectiveness as ambient lighting increases. Hence, within zones having bright street lighting, during dusk or daytime high-intensity lights cannot be relied upon as a method of crowd control.

Some high intensity lights on vehicles cannot be employed to illuminate crowds in locations which do not permit vehicular traffic.

Some high intensity lights emitting only a single color do not adequately degrade the visual acuity of hostile persons within the crowd.

Thus, all above mentioned high intensity lights are defective in effectively protecting police from those within a crowd wishing to do them harm.

BRIEF DESCRIPTION OF THE DRAWINGS

One or more embodiments are illustrated by way of example, and not by limitation, in the Figs. of the accompanying drawings, wherein elements having the same reference numeral designations represent like elements throughout.

DETAILED DESCRIPTION OF THE DRAWINGS

Figure 1:
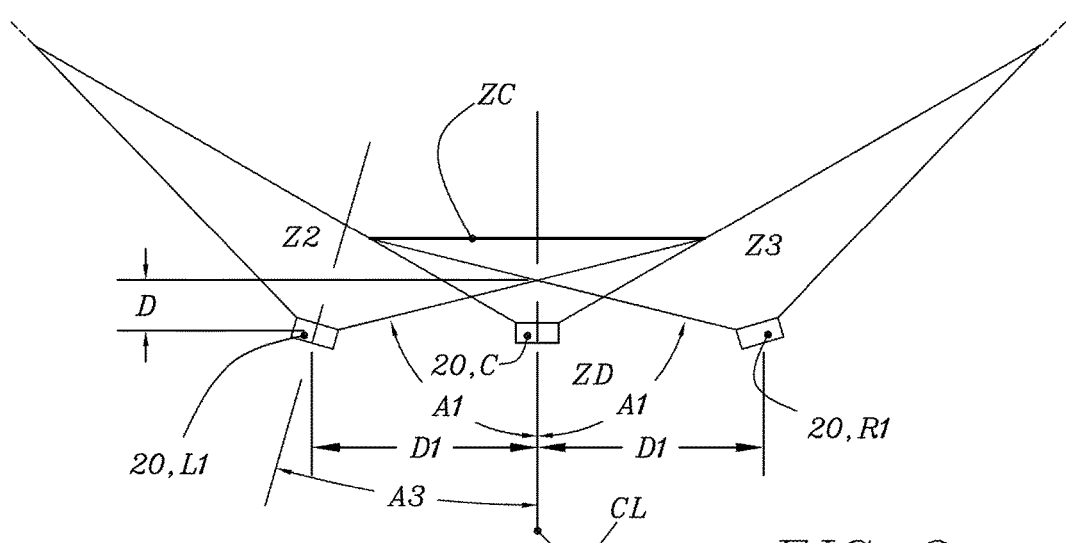
FIG. 1 is a top view of crowd control lighting system 50 according to some embodiments.

According to some embodiments of the present disclosure, the crowd control lighting system employs a plurality of flashing lights to continuously illuminate a crowd located within an illumination zone thereby providing a constant view of persons within the crowd seeking to harm law-enforcement officers.

Unruly crowds can vary in size and can quickly change their location. According to some embodiments of the present disclosure having a plurality of lights each of which are portable or capable of being directed makes it easy for law-enforcement to select the size and location of the illumination zone to permit law enforcement to redirect emitted light to assure substantially constant illumination of the crowd within the illumination zone.

According to some embodiments of the present disclosure, the plurality of lights includes elongated beam patterns in order to conform to the configuration of a typical illumination zone (crowd) which is typically elongated in the horizontal direction. Matching the beam patterns with the typical illumination zone increases the magnitude of illumination within the zone making the crowd control lighting device more effective.

According to some embodiments of the present disclosure, increasing the magnitude of the illumination of the illumination zone increases the effectiveness of the crowd control lighting system and overlapping the emitted light from the plurality of lights increases the magnitude of the illumination of the illumination zone.

According to some embodiments of the present disclosure, the beam spread angle exceeds 40° in the horizontal plane.

According to some embodiments of the present disclosure, increasing the magnitude of the illumination of the illumination zone increases the effectiveness of the crowd control lighting system and concentrating the emitted light from each of the plurality of lights into directional light beams increases the magnitude illumination of the illumination zone.

According to some embodiments of the present disclosure, increasing the illumination of the illumination zone deters a person in the crowd from accurately targeting a law-enforcement officer even when ambient lighting permits the person in the crowd to see the law enforcement officer.

According to some embodiments, employing individual lights having directional light beams increases the intensity of the individual light beams because an optical system collects light from many directions to concentrate the light into the directional beam. The concentrated light of the directional beam beneficially increases the illumination of the crowd. At the same time the optical system redirects light each would illuminate zones exterior to the directional beam reducing the intensity exterior to the directional light beam and minimizing possible illumination of a dark zone.

According to some embodiments of the present disclosure, each of the plurality of flashing lighting devices includes an opaque housing such that when the flashing lighting devices are positioned to emit overlapping light beams to illuminate an illumination zone in front of law-enforcement officers, a dark zone (a zone not directly illuminated by the plurality of flashing lights) deters those in the crowd from seeing law-enforcement officers standing behind the lighting devices.

According to some embodiments of the present disclosure, each of the plurality of lighting devices has its emitted light concentrated and intensified to form a directional light beam aimed at a common illumination zone to converge upon and overlap at the common illumination zone to maximize the illumination of the common illumination zone. At the same time, the plurality of lighting devices is not configured to illuminate a dark zone occupied by law-enforcement officers such that their eyesight is not degraded by the plurality of lights. According to some embodiments, the plurality of light beams must at least partially overlap at the common illumination zone to increase the illumination at the common illumination zone. According to some embodiments, a dark zone exterior to the common illumination zone is not illuminated by the plurality of flashing directional light beams. According to some embodiments, a dark zone which is not within the beam spread of any of the plurality of directional flashing light beams is provided such that the eyesight of persons within the dark zone is maintained. According to some embodiments, a dark zone is provided such that persons within the dark zone are not illuminated by the plurality of directional flashing light beams.

According to some embodiments of the present disclosure, the plurality of lighting devices is directable, e.g., directed such that the light beams or the axes of the light beams converge to illuminate a selected illumination zone. According to some embodiments, the angular beam spreads of the plurality of lighting devices have magnitudes configured to converge and overlap such that the light emitted from the lighting devices fully illuminate a common illumination zone selected from the many illumination zones which could be required to illuminate a variety of hostile crowds.

According to some embodiments of the present disclosure, the light emitted from the plurality of lighting devices include a plurality of related flashing illuminating waveforms with the relationships and illuminating waveforms determined or organized by a wireless controller. According to some embodiments a wireless transmitter controlled by microcontroller is a wireless controller.

According to some embodiments of the present disclosure, the light emitted from the plurality of lighting devices include a plurality of related flashing illuminating waveforms with the relationships and illuminating waveforms correlated with the placement of each of the lighting devices relative to a selected illumination zone.

According to some embodiments, each light is configured such that its illuminating waveform is selectable to correlate with its placement relative to a selected illumination zone.

According to some embodiments of the present disclosure, the controller is configured to change the illuminating waveforms at one or more locations relative to a selected illumination zone to deter persons in the crowd from employing a fixed relationship amongst the plurality of lighting devices to target law-enforcement officers. According to some embodiments, the illuminating waveform emitted from a plurality of lighting devices is changed simultaneously to maintain a constant illumination of a selected illumination zone.

According to some embodiments of the present disclosure, the controller is programmed to temporarily extinguish all lighting devices as an additional method of deterring persons in the crowd from accurately targeting law-enforcement officers.

According to some embodiments of the present disclosure, the controller is programmed to temporarily illuminate all lighting devices in a constant "ON" mode as an additional method of deterring persons in the crowd from accurately targeting law-enforcement officers.

According to some embodiments of the present disclosure, configuring each lighting device of the plurality of lighting devices such that its illuminating waveform is selectable to correlate with its placement relative to a selected illumination zone assures that all available lighting devices would be employable for a selected illumination zone thereby avoiding delays in setting up the crowd control lighting which would occur if all the available lighting devices could only be deployed at a single location relative to a selected illumination zone.

According to some embodiments of the present disclosure, configuring each lighting device of the plurality of lighting devices such that it is selectable to function as a lighting device deployed to illuminate a selected illumination zone and also as the controller for the plurality of lighting devices avoids delays in setting up the crowd control lighting which would occur if a separate controller or a single lighting device having a controller was required to control the illuminating waveforms of the light emitted by the plurality of lighting devices.

According to some embodiments of the present disclosure, the relationships and illuminating waveforms are configured for a person in a crowd in the illumination zone subjected to a plurality of short duration flashes of light emitted from a plurality of locations such that the person cannot accurately or reliably establish the exact location of any one of the plurality of lighting devices.

According to some embodiments of the present disclosure, the plurality of flashing lighting devices of short duration emitted from a plurality of locations deters a person in the crowd from seeing a law enforcement officer in the dark zone behind the lights.

According to some embodiments of the present disclosure, the relationships between or among the plurality illuminating waveforms are organized or determined by the controller are such that a law enforcement officer behind the lighting devices perceives persons in the crowd as constantly illuminated similar to the constant illumination that would result from one or more continuously "ON" high-intensity lights illuminating the crowd.

According to some embodiments of the present disclosure, the plurality of lights are separated by a distance and each is energized by a separate source of electrical power thereby permitting rapid deployment of the system without creating a tripping hazard which would result from wires stretching from light to light.

According to some embodiments of the present disclosure, the relationships between or among the plurality of illuminating waveforms determined by the controller are maintained by wireless remote control and each of the plurality of lighting devices energized by separate sources of electrical power such that the crowd control lighting system can be quickly set up and deployed without creating a tripping hazard during the confusing process of crowd control.

According to some embodiments of the present disclosure, each of the plurality of lighting devices along with a dedicated power supply are included in a portable case such that the portable crowd control lighting system can be quickly set up and deployed to almost any location. According to some embodiments, each of the plurality of lighting devices is energized by a vehicle. According to some embodiments, each of the plurality of lighting devices is energized by being plugged into the utility lighter on a vehicle.

According to some embodiments of the present disclosure, each of the plurality of lighting devices is supported by an adjustable base permitting the light beam emitted from that lighting device to be manually directed or aimed towards a common illumination zone such that the plurality of light beams emitted from the plurality of lighting devices converges to overlap and illuminate the common illumination zone.

According to some embodiments of the present disclosure, the plurality of lighting devices is configured to emit light of at least two colors thereby creating an additionally unpleasant environment further encouraging crowd disbursement.

According to some embodiments of the present disclosure, the plurality of lighting devices is configured to emit light of at least two colors thereby further confusing the perception and degrading the ability of persons in the crowd to target law-enforcement officers.

FIG. 1 is a top view of crowd control lighting system 50 according to some embodiments. Lighting system 50 has a first lighting device 20 at position central C on centerline CL of common illumination zone ZC. Lighting system 50 also includes a second lighting device 20 at position left one L1 at clockwise angle A1 and distance D1 from centerline CL and a third lighting device 20 at position right one R1 at counterclockwise angle A1 and distance D1 from centerline CL. Position left one L1 and position right one R1 are according to some embodiments located at distance D behind common illumination zone ZC. Common illumination zone ZC represents the location of a hostile crowd.

According to some embodiments, crowd control lighting system 50 is portable permitting it to illuminate any crowd location or any illumination zone. Therefore common illumination zone ZC can be selected from a plurality of illumination zones which could be occupied by a hostile crowd.

Figure 2:
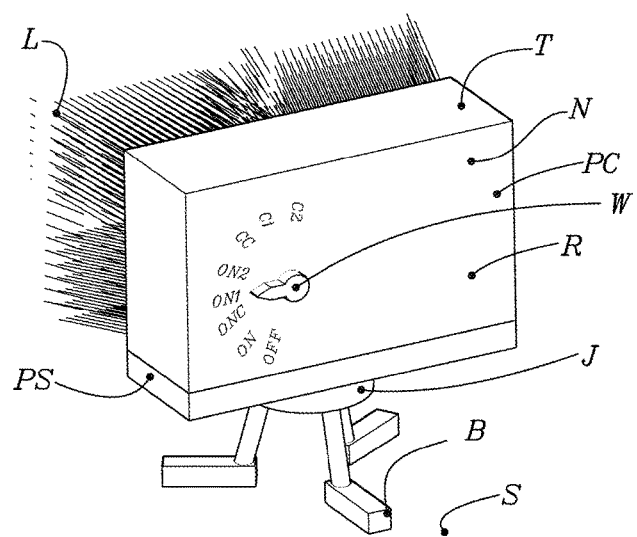
FIG. 2 is a perspective view of lighting device 20 according to some embodiments.

FIG. 2 is according to some embodiments a perspective view of lighting device 20. According to some embodiments, lighting device 20 is a light emitting diode (LED) light source emitting an intense beam of light L. According to some embodiments, lighting device 20 is portable, energizable by a lightweight battery and also intense because of the efficiency of its light emitting diode (LED) light source.

FIG. 2 is according to some embodiments a perspective view of base B for supporting or standing lighting device 20 on surface S. According to some embodiments, base B includes ball joint J which permits the beam of light L emitted from lighting device 20 to be adjusted about the vertical and horizontal planes to illuminate a selected common illumination zone. Lighting device 20 employs base B such that lighting device 20 can be positioned at any location with its emerging light beam aimed as required to illuminate any illumination zone selected from a plurality of illumination zones. According to some embodiments, lighting device 20 is positioned to direct its beam towards common illumination zone ZC. According to some embodiments, a plurality of lighting devices 20 each aim or focus their individual light beams to converge to illuminate common illumination zone ZC. According to some embodiments, base B permits lighting device 20 to be adjusted in the vertical plane and horizontal adjustment is achieved by rotating lighting device 20 including base B.

According to some embodiments, each lighting device 20 includes a rotary switch W which is configured to select the position and function of the lighting device for a particular crowd control situation. According to some embodiments, rotary switch W additionally offers a steady mode for other police situations which require steady illumination and an "OFF" mode for a situation of storing the lighting device.

According to some embodiments, crowd control lighting system 50 of FIG. 1 includes a plurality of identical lighting devices similar to lighting device 20 of FIG. 2. This is done to permit each light to function in any of the positions required to facilitate the deployment of the crowd control lighting system 50 of FIG. 1. FIG. 2 shows rotary switch W at the back of lighting device 20 for selecting the location and function of the lighting device for a particular deployment of crowd control lighting system 50.

According to some embodiments, lighting device 20 includes integral power supply PS which is a lithium ion battery. According to some embodiments, lighting device 20 can also be energized using a wire connected to any of a variety external power sources.

According to some embodiments, lighting device 20 includes integral power controller PC which is a microcontroller connected to a wireless transmitter T and receiver N. According to some embodiments, power controller PC is programmed to respond to the rotational position of rotary switch W. The details of the response will be later described. According to some embodiments, power controller PC is active in a first lighting device 20 as shown in FIG. 1 and that first lighting device wirelessly controls the remaining lighting devices as shown in FIG. 1 such that even though each of the plurality of directional light beams flashing the common illumination zone is continuously illuminated. According to some embodiments, power controller PC organizes the plurality of illuminating waveforms such that when the plurality of flashing directional light beams overlap, the common illumination zone appears to be evenly and continuously illuminated.

According to some embodiments, lighting device 20 includes rear face $R_{[A1]}$ which is opaque to prevent illumination to the rear of lighting device 20 therefore creating a dark zone ZD to the rear of the crowd of the lighting system 50, see, e.g., FIG. 1. Law-enforcement officers standing in the dark zone ZD are not visible and therefore not targetable by hostile persons within the crowd. In addition, the law-enforcement officers' eye sight is not negatively affected by the illumination in front of crowd control lighting system 50.

According to some embodiments, base B can also be permanently attached to a vehicle permitting lighting device 20 to be rotated and directed as required. According to some embodiments, base B includes magnets permitting rapid attachment to a steel surface.

According to some embodiments, lighting device 20 includes optics which focus its emitted light into a directional light beam thereby increasing the illumination in front of the light within the beam spread and reducing illumination exterior to the beam spread. According to some embodiments, the directional light beam is elongated in the horizontal direction.

Figure 3:
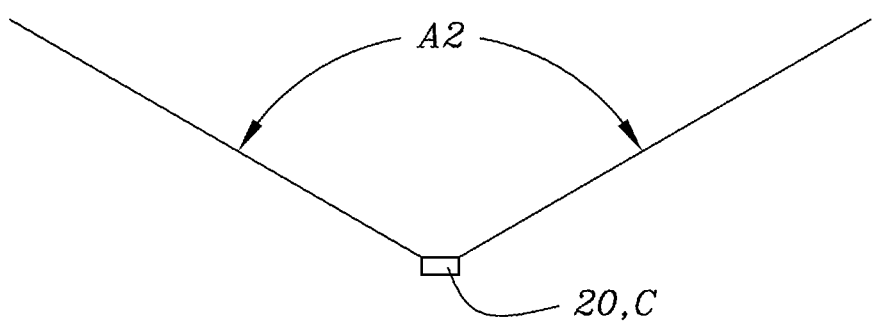
FIG. 3 is a top view of lighting device 20 according to some embodiments.
Figure 4:
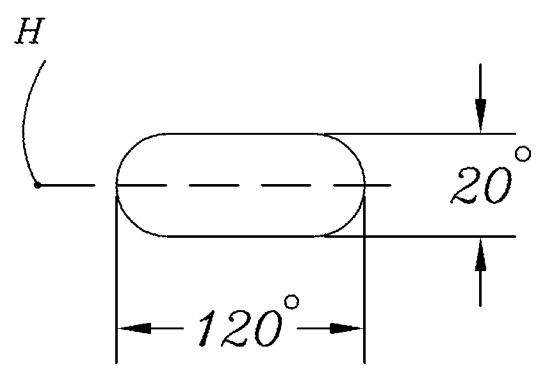
FIG. 4 is a diagram of the projected light beam spread of lighting device 20 of FIG. 2.

FIG. 3 is according to some embodiments a top view of lighting device 20 having an elongated beam with a horizontal beam spread angle A2 of 120°. FIG. 4 is a front view of the projected elongated directional light beam pattern emerging from lighting device 20 of FIG. 3 having a horizontal beam spread angle of 120° and a vertical beam spread angle of 20°. According to some embodiments the beam spread angle is the angle between the two directions opposed to each other over the beam axis for which the luminous intensity is half that of the maximum luminous intensity. According to some embodiments, the directional light beam pattern can have configurations other than elongated. According to some embodiments, the directional light beam pattern can have a circular or other configuration and still employ the concepts of the embodiments in the present disclosure. According to some embodiments a directional light beam is a light beam having a beam spread angle less than 360°.

FIG. 4 is a front view of the projected elongated directional light beam pattern emerging from a single lighting device 20. According to some embodiments of the present disclosure, the plurality of lighting devices of the crowd control lighting system 50 is positioned and aimed to overlap such that FIG. 4 can also represent the projected beam pattern from the plurality of lighting devices of the crowd control lighting system 50. According to some embodiments the plurality of the projected light beams from the plurality of lighting devices overlap at a common illumination zone which is at a distance from the plurality of lighting devices. If the common illumination zone is moved such that it is at a new distance from the plurality of lighting devices or a different common illumination zone is selected the plurality of lighting devices have to be rearranged or redirected such that they overlap at the new common illumination zone. According to some embodiments each of the lighting devices are supported by a base which permits that lighting device to be rotated both horizontally and vertically such that directional light beam can be directed to illuminate any selected illumination zone.

Referring back to FIG. 2 according to some embodiments, lighting device 20 includes a rotary switch W having the following selections:

OFF—for extinguishing the lighting device when not in use.

ON—for energizing the lighting device to emit a steady beam of light.

ONC—for energizing the lighting device to be placed at a central position C of a common illumination zone with its illumination waveform remotely controlled.

ON1—for energizing the lighting device to be placed at position 1 of a common illumination zone with its illumination waveform remotely controlled.

ON2—for energizing the lighting device to be placed at position 2 of a common illumination zone with its illumination waveform remotely controlled.

CC—for energizing the lighting device to be placed at central position C of a common illumination zone with its internal controller controlling its illumination waveform and remotely controlling the illumination waveform of all the remaining lights of crowd control lighting system.

C1—for energizing the lighting device to be placed at position 1 of a common illumination zone with its internal controller controlling its illumination waveform and remotely controlling the illumination waveform of all the remaining lights of crowd control lighting system.

C2—for energizing the lighting device to be placed at position 2 of a common illumination zone with its internal controller controlling its illumination waveform and remotely controlling the illumination waveform of all the remaining lights of crowd control lighting system.

According to some embodiments of the present disclosure, lighting device 20 responds to the rotary switch W selections as follows:

OFF—The lighting device turns "OFF".

ON—The lighting device turns "ON" in a steady mode only.

ONC—The lighting device is energized and awaits a signal from a control light. The signal will energize the lighting device with a remotely controlled illumination waveform appropriate for a lighting device placed at central position C.

ON1—The lighting device is energized and awaits a signal from a control light. The signal will energize the lighting device with a remotely controlled illumination waveform appropriate for a lighting device placed at position 1.

ON2—The lighting device is energized and awaits a signal from a control light. The signal will energize the lighting device with a remotely controlled illumination waveform appropriate for a light placed at position 2.

CC—According to some embodiments of the present disclosure, the lighting device is energized for placement at central position C. Its internal controller PC energizes its light with an illumination waveform appropriate for a lighting device placed at central position C. In addition, its internal controller PC causes its wireless transmitter T to emit a signal for each of the remaining lighting devices in crowd control lighting system 50. The remaining lighting devices having rotary switch selections ONC will receive their signal on their wireless receiver N and that signal will affect those lighting devices emitting an illumination waveform appropriate for a lighting device placed at central position C. The remaining lighting devices having rotary switch selections ON1 will receive their signal on their wireless receiver N and that signal will affect those lighting devices emitting an illumination waveform appropriate for a lighting device placed at position 1. The remaining lighting devices having rotary switch selections ON2 will receive their signal on their wireless receiver N and that signal will affect those lighting devices emitting an illumination waveform appropriate for a lighting device placed at position 2.

C1—According to some embodiments of the present disclosure, lighting device is energized for placement at central position 1. Its internal controller PC energizes its light with an illumination waveform appropriate for a lighting device placed at position 1. In addition its internal controller PC causes its wireless transmitter T to emit a signal for each of the remaining lighting devices in crowd control lighting system 50. The remaining lighting devices having rotary switch selections ONC will receive their signal on their wireless receiver N and that signal will affect those lighting devices emitting an illumination waveform appropriate for a light placed at central position C. The remaining lighting devices having rotary switch selections ON1 will receive their signal on their wireless receiver N and that signal will affect those lighting devices emitting an illumination waveform appropriate for a lighting device placed at position 1. The remaining lighting devices having rotary switch selections ON2 will receive their signal on their wireless receiver N and that signal will affect those lighting devices emitting an illumination waveform appropriate for a light placed at position 2.

C2—According to some embodiments of the present disclosure, the lighting device is energized for placement at position 2. Its internal controller PC energizes its lighting device within illumination waveform appropriate for a lighting device placed at central position 2. In addition its internal controller PC causes its wireless transmitter T to emit a signal for each of the remaining lighting devices in crowd control lighting system 50. The remaining lighting devices having rotary switch selections ONC will receive their signal on their wireless receiver N and that signal will affect those lighting devices emitting an illumination waveform appropriate for a lighting device placed at central position C. The remaining lighting devices having rotary switch selections ON1 will receive their signal on their wireless receiver N and that signal will affect those lighting devices emitting an illumination waveform appropriate for a lighting device placed at position 1. The remaining lighting devices having rotary switch selections ON2 will receive their signal on their wireless receiver N and that signal will affect those lighting devices emitting an illumination waveform appropriate for a lighting device placed at position 2.

According to some embodiments, a discrete wireless transmitter can activate the lights each of which has a wireless receiver. According to some embodiments, the wireless transmitter, e.g., some wireless control systems are used in opening car doors and numerous other applications, can be employed in crowd control lighting system 50 According to some embodiments, the wireless transmitter can be controlled by a microcontroller configured or organized to illuminate lights with different but related illuminating waveforms depending upon their locations.

According to some embodiments of the present disclosure, the above-mentioned rotary switch W selections for lighting devices at position 2 are not required for crowd control lighting system 50 because the lighting system 50 employs only three of lighting device 20. However, for more complex crowd control lighting systems according to some other embodiments having five lighting devices to be later described switch W selections for lighting devices at position 2 are required.

Figure 5:
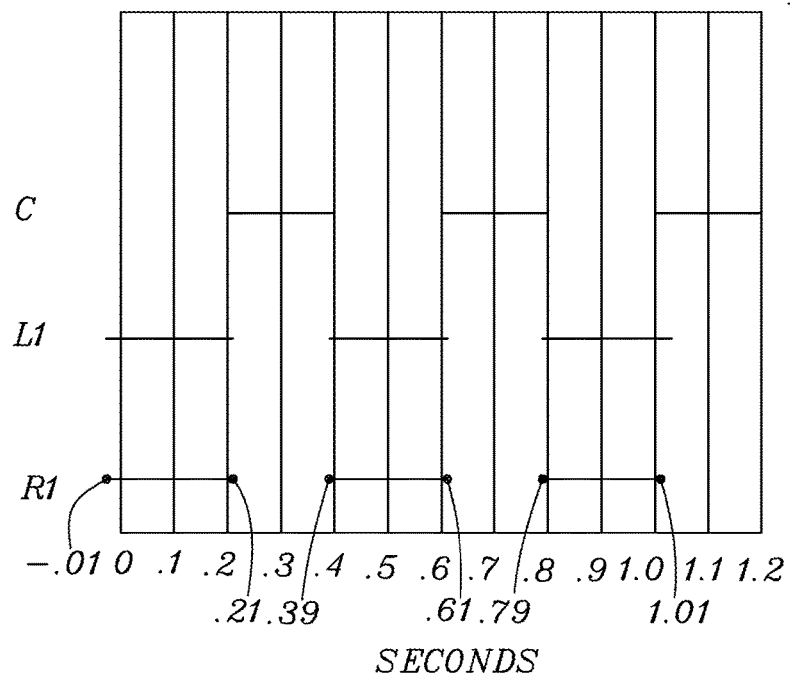
FIG. 5 is a diagram of the flashing waveforms of the three lighting devices of crowd control lighting system 50.

According to some embodiments, FIG. 5 showing a relationship between the illuminating waveforms of crowd control lighting system 50 indicates a lighting device 20 at position left one L1 and a lighting device 20 at position right one R1. Although these lighting devices are at left and right positions relative to common illumination zone ZC, according to some embodiments, each switch S placed in the ON1 position making their illumination waveforms identical such that the lighting devices at left and right are simultaneously "ON". A third lighting device 20 is placed at position central C with its switch place in the CC position making the third lighting device 20 the controller and its illumination waveform out of synchronization with the lighting devices at position left one L1 and at position right one R1.

Crowd control lighting system 50 of FIG. 1 includes three identical lighting devices conforming to lighting device 20. According to some embodiments, other configurations include different quantities of lighting devices. According to some embodiments the crowd control lighting system of the present disclosure includes a plurality of lighting devices which are not identical yet which still combine to achieve the objectives of the embodiments in the present disclosure.

FIG. 5 is a diagram of the illuminating waveforms of the lighting devices of crowd control lighting system 50 shown in FIG. 1. FIG. 5 discloses the "ON/OFF" times of the three lights of FIG. 1. According to some embodiments, the lights emit beams of substantially equal intensity. The intensities and waveforms of the embodiments in FIG. 5 may differ for other embodiments and still employ the concepts of the present disclosure. FIG. 5 according to some embodiments shows a first lighting device 20 at position central C illuminating between 0.2 and 0.4 seconds, "OFF" between 0.4 and 0.6 seconds, illuminating between 0.6 and 0.8 seconds, "OFF" between 0.8 and 1.0 seconds, etc. FIG. 5 additionally according to some embodiments shows a second lighting device 20 at position left one L1 and a third lighting device 20 at position right one R1 both simultaneously illuminating between −0.01 and 0.21 seconds, "OFF" between 0.21 and 0.39 seconds, illuminating between 0.39 and 0.61 seconds, "OFF" between 0.61 seconds and 0.79 seconds, illuminating between 0.79 seconds and 1.01 seconds and etc.

According to some embodiments, FIG. 5 shows a slight overlap between the "OFF" zones of the lighting device 20 at position central C and the illuminating or "ON" zones of the lighting devices at position left one L1 and position right one R1. According to some embodiments, the overlap is beneficial in providing the appearance of a crowd which is evenly and continuously illuminated. According to some embodiments, a slight overlap between the "OFF" and "ON" zones is not required.

According to some embodiments, FIG. 5 shows that when all three lighting devices of crowd control lighting system 50 emit their directional light beams at a common illumination zone (a crowd), the crowd is continuously illuminated similar to the illumination offered by a single steady light. This constant illumination permits law-enforcement officers behind the lights to accurately and continuously view the crowd for possible troublemakers.

According to some embodiments, FIG. 5 additionally shows that persons in the crowd can only see shifting beams of bright light. The beams of light are rapidly switching from "ON" to "OFF" so that persons within the crowd cannot focus upon officers behind the lights to target them.

Lighting device 20 of FIG. 2 includes an internal lithium ion battery PS, a power controller PC, a wireless transmitter T and a wireless receiver N. The lithium ion battery provides enough energy to create a high intensity LED-based illumination. According to some embodiments, the wireless transmitter T and receiver N employ radio waves to communicate. According to some embodiments, the wireless sender and receiver employ infrared light to communicate. According to some embodiments, the wireless sender and receiver employ sound waves to communicate. According to some embodiments, the lighting devices are interconnected with hardwiring to replace the sender and receiver. According to some embodiments, the power controller includes a microcontroller. According to some embodiments, lighting device 20 is powered by line power, an external battery or by vehicular power.

The crowd control often requires a rapid response from law enforcement. Lighting device 20, which is configured as a controller/illuminator or as an illuminator at any location within the crowd control system, assures that law enforcement can quickly set up a crowd controls system because it is relatively easy to assure that at least two lighting devices are quickly available.

According to some embodiments, lighting device 20 at position left one L1 and lighting device at position right one R1 each emits directional beams and is tilted towards centerline CL at a tilt angle A3, e.g., 16°. According to some embodiments, these directional beams overlap to define zone ZC which represents the location of the crowd to be controlled. According to some embodiments, beam spread angle A2 and tilt angle A3 interact to define the location and magnitude of zone ZC. According to some embodiments, the beam spread angle A2 and tilt angle A3 can vary substantially from those employed as shown in in the present disclosure while still employing the concepts of the embodiments in the present disclosure.

According to some embodiments, lighting device 20 includes an LED lighting device which is beneficial because of its ability to quickly change from "ON" to "OFF". According to some embodiments, lighting device 20 can employ other light sources and still use the concepts of the present disclosure.

According to some embodiments, a person in the crowd first sees lighting device 20 at position center C emitting a bright light before the person can determine the exact location of position center C lighting device 20 at location extinguishers. According to some embodiments, lighting devices at positions left one L1 and right one R1 simultaneously illuminate each emitting a bright light before the person can determine the exact locations of position left one L1 and position right one R1 the lighting devices at these locations extinguishers. According to some embodiments, lighting device 20 at position center C almost simultaneously illuminates with the lighting devices at positions left one L1 and right one R1. This process of switching illumination from location to location continues such that the person in the crowd becomes uncomfortable and decides to leave the illumination zone. This uncomfortable environment is not experienced by an officer in dark zone ZD behind the lighting devices and not in the path of the directional beams of the lighting devices. An officer in dark zone ZD sees the crowd as substantially evenly illuminated with minimal variations in intensity and with minimal shadows.

According to some embodiments, when lighting device 20 at position C is illuminating a person in the crowd—due to the fact that lighting device 20 is substantially directly in front of the person—an officer behind crowd control lighting system 50 would see the person clearly with minimal shadows. According to some embodiments, when lighting device 20 at position left one L1 is illuminating a person in the crowd—due to the fact that lighting device 20 is illuminating the person at an angle an officer behind crowd control lighting system 50 would see a shadow of the person to the right of the person. According to some embodiments, shadows of persons in the crowd are not desirable. According to some embodiments, crowd control lighting system 50 includes a second lighting device 20 at position right one R1 which is illuminating at the same time that lighting device at position left one L1 is illuminating. The addition of a second lighting device at position right one R1 substantially minimizes the problem of a shadow created by lighting device at position left one L1 by adding illumination to the shadow area created by the lighting device at position left one L1. This minimizes the visibility of the shadow. In addition the lighting device at position right one R1 creates a balancing shadow on the left (other) side of the person. This shadow in turn is minimized by direct lighting from the lighting device at position left one L1. According to some embodiments, the combination of a lighting device at position right one R1 and a balancing lighting device at position left one L1 has the effect of improving the visibility of persons and elements in the crowd.

According to some embodiments, the magnitude of the illumination is substantially constant even though a single lighting device is illuminating at center position C and two lighting devices are illuminating off the centerline at positions left L1 and position right R1 respectively. According to some embodiments, the single lighting device at center position C is closer to the crowd and therefore its illumination of the crowd is more effective than the illumination provided by each of the off centerline lights at positions left L1 and position right R1 respectively which are less effective in illuminating the crowd. The configuration of two off centerline lighting devices helps to maintain the magnitude of the illumination of the crowd at a constant value even though individual lighting devices are at different distances from the crowd.

According to some embodiments of the crowd control lighting system, some or all of the flashing lighting devices alternate between full "ON" and full "OFF". According to some embodiments, some or all of the flashing lighting devices could alternate between a high-intensity and a low intensity where the high-intensity is at least two times the intensity of the low intensity.

According to some embodiments, due to the fact that lighting devices 20 emit a directional light beam which is directed towards the crowd in the zone, an officer behind crowd control lighting system 50 would remain in dark zone ZD and not visible to persons in the crowd. In addition the officers' eyes would not be subject to illumination or flashing illumination and therefore would maintain their visual acuity.

According to some embodiments, at any point in time at least one of the three lighting devices of crowd control lighting system 50 is illuminating the crowd in common illumination zone ZC. According to some embodiments a law enforcement officer behind the lights would view an evenly illuminated crowd with minimal variations in illumination such that the officer could identify possible threats or dangerous persons before they cause harm. According to some embodiments, minimizing variations in illumination preserves the officers visual acuity and thereby accuracy if use of a weapon was necessary.

According to some embodiments, testing of the crowd control lighting system has indicated that providing an overlap of short duration between the time when the lighting device at position central C extinguishes and the time when lighting devices at positions left one L1 and right one R1 illuminate beneficially avoids the perception of a flicker to observers behind the crowd control lighting system. According to some embodiments, the overlap of short duration is minimized to avoid a person in the crowd obtaining a visual fix on the relationship between the lighting devices at the various locations. According to some embodiments, the overlap of short duration is minimized to avoid the illumination of the crowd—as viewed by a law enforcement officer behind the lights—from unacceptably increasing during that short period of time.

According to some embodiments, the crowd control lighting system includes two lighting devices and the power control PC and switch W selections are configured to alternate the lights. The first lighting device would have switch W set to C1 and the second lighting device would have switch W set to ON1. This configuration is similar to crowd control lighting system 50 of FIG. 1 without the lighting device 20 at position center C, but with the first lighting device located at position left one L1 and the second lighting device located at position right one R1. The first lighting device would—due to the selection of its switch— have its control circuit activated to send a signal to the second lighting device to have its illumination alternate with the first lighting device.

Figure 6:
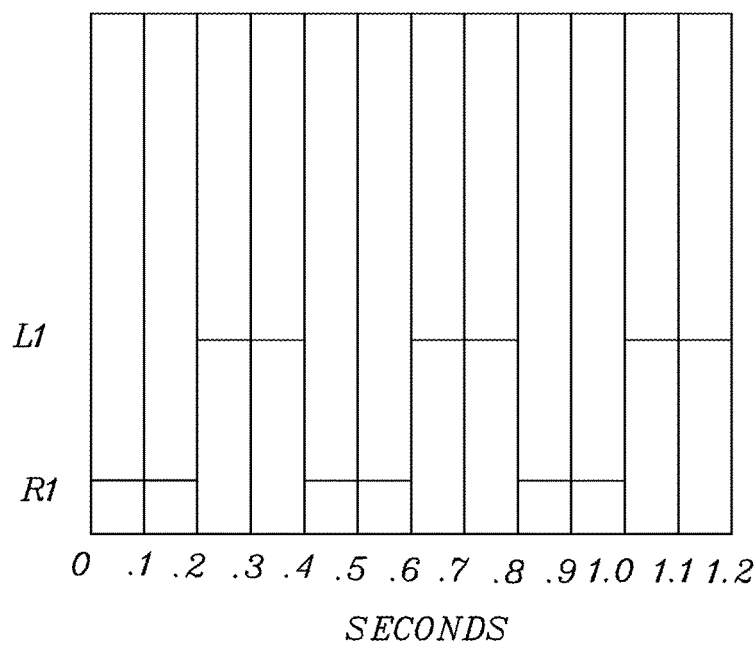
FIG. 6 is a diagram of alternate flashing waveforms of two lighting devices from crowd control lighting system 50 according to some embodiments.

According to some embodiments of the present disclosure, FIG. 6 is a diagram of alternate illuminating waveforms which could replace the waveforms of FIG. 5 of crowd control lighting system 50 when crowd control lighting system 50 includes only two of lighting device 20. According to some embodiments, the overlapping of light beams is not necessary and therefore in order to reduce the complexity. FIG. 6 does not show the overlapping of light beams shown in FIG. 5. FIG. 6 discloses "ON/OFF" times for two of the lighting devices of FIG. 1. FIG. 6 according to some embodiments shows a first lighting device 20 at position right one R1 illuminating between 0 and 0.2 seconds, "OFF" between 0.2 and 0.4 seconds, illuminating between 0.4 and 0.6 seconds, "OFF" between 0.6 and 0.8 seconds, etc. FIG. 6 additionally according to some embodiments shows a second lighting device 20 at position left one L1 illuminating between 0.2 and 0.4 seconds, "OFF" between 0.4 and 0.6 seconds, illuminating between 0.6 and 0.8 seconds, "OFF" between 0.8 seconds and 1.0 seconds and etc. According to some embodiments the FIG. 6 illumination can confuse persons in the crowd because they see flashes of light coming from different locations while the same time provides law-enforcement officers in dark zone ZD a continuous illumination of substantially constant magnitude of persons in the crowd.

Figure 7:
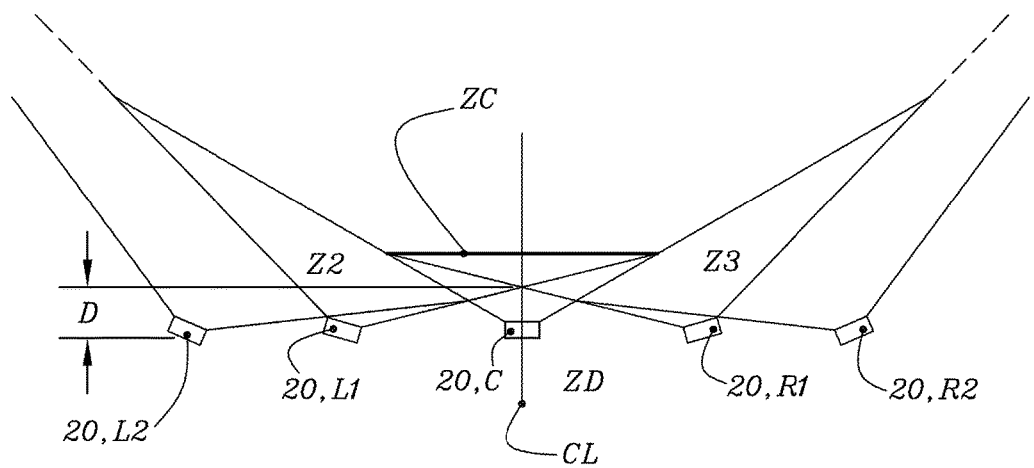
FIG. 7 is a top view of crowd control lighting system 60 according to some embodiments.
Figure 8:
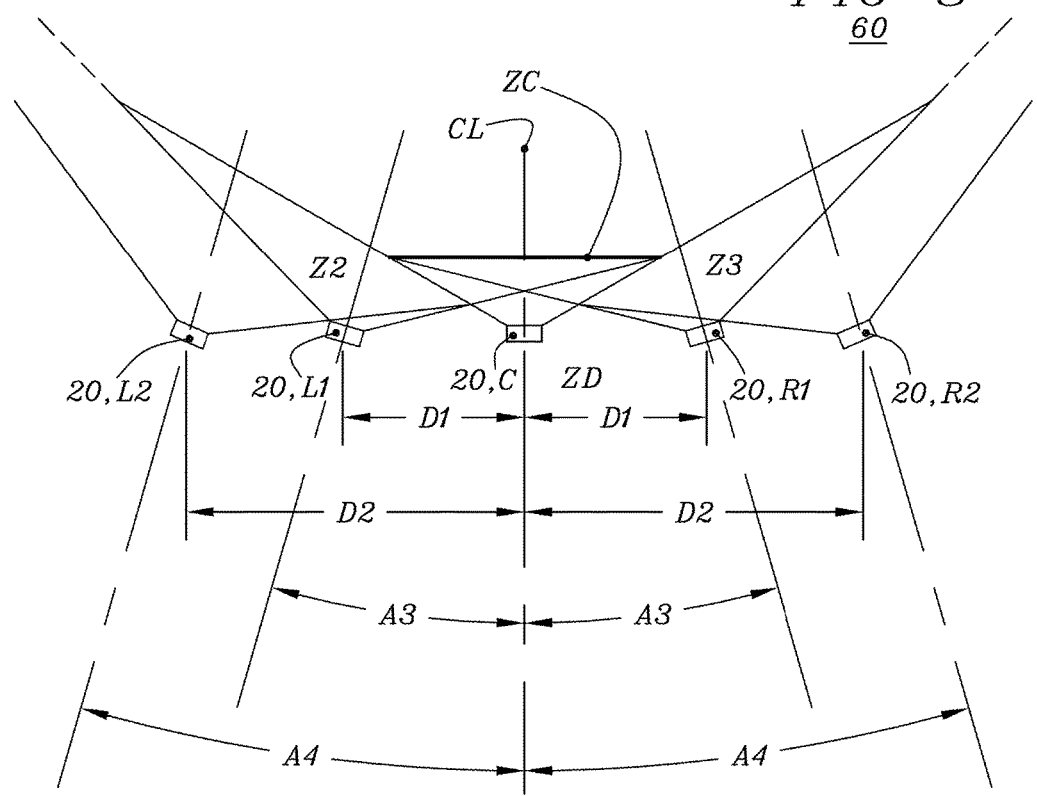
FIG. 8 is a top view of crowd control lighting system 60 with dimension information.

According to some embodiments, FIGS. 7 and 8 are top views of crowd control lighting system 60. FIG. 8 shows the same configuration of the crowd control lighting system 60 of FIG. 7 with additional dimensional indicators. Crowd control lighting system 60 includes crowd control lighting system 50 of FIG. 1 with a fourth one of lighting device 20 at position left two L2 at tilt angle A4 and distance D2 about centerline CL and a fifth one of lighting device 20 at position right two R2 at tilt angle A4 and distance D2 about centerline CL. Each of the five lights is positioned such that its emerging beam converges upon common zone ZC. The plurality of five light emitting diode (LED) lights emit a plurality of flashing directional light beams aimed to overlap to provide increased illumination within common zone ZC.

Figure 9:
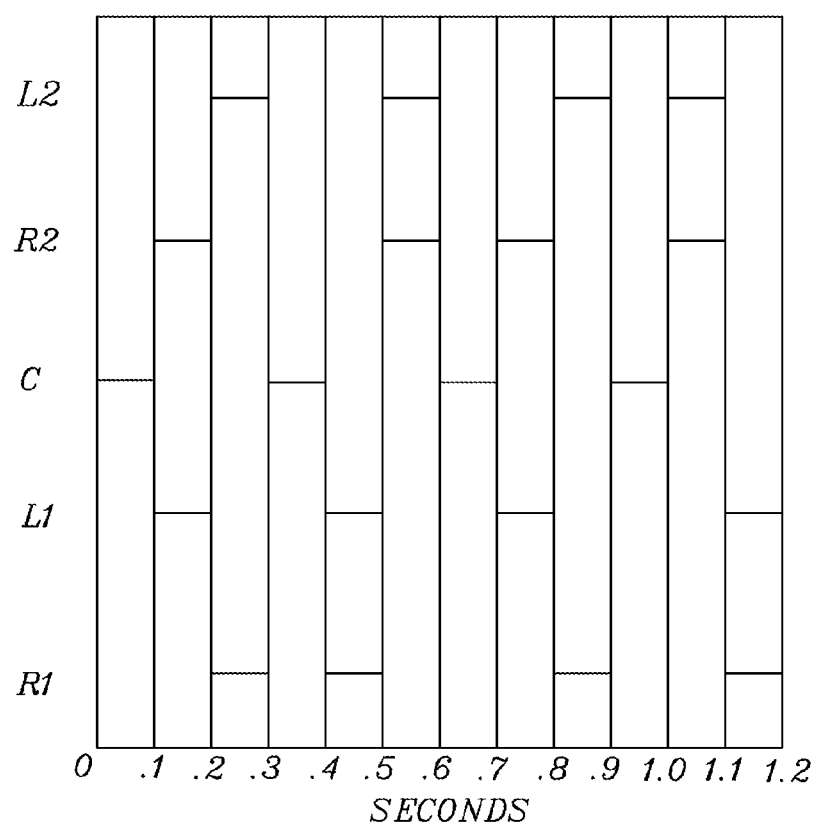
FIG. 9 is a diagram of the flashing waveforms of the five lighting devices of crowd control lighting system 60 according to some embodiments.

FIG. 9 is a first diagram of a plurality of flashing waveforms of crowd control lighting system 60 according to some embodiments.

According to some embodiments, FIG. 9 shows flash durations of 0.1 seconds which are substantially less than the 0.2 second duration employed in FIG. 6. According to some embodiments, shorter flash durations make it more difficult for persons in the crowd to target law-enforcement officers and the shorter flash durations of FIG. 9 achieve that objective while still providing continuous illumination of the crowd. Crowd control lighting system 60 according to the embodiment of FIG. 9 includes five individual lighting devices. According to some embodiments, additional lighting devices make it possible to reduce the flash duration and further confuse persons in the crowd by increasing the locations from which the bursts of light emerge. According to some embodiments, a crowd control lighting device can have lighting devices with a variety of flash durations and still employ the concepts of the embodiments in the present disclosure. According to some embodiments, lighting devices having a wide range of flash durations including flash durations between 0.01 and 0.9 seconds can still employ the concepts of the embodiments in the present disclosure.

FIG. 9 also shows a visually random pattern of bursts of light which according to some embodiments makes it more difficult for persons in the crowd to target law-enforcement officers positioned in dark zone ZD.

According to some embodiments, all of the lights in FIG. 9 are white. According to some embodiments, lights emitted by the lighting devices at position left one position L1 and position right two R2 are red and lights emitted by the lighting devices at the remaining positions are white or other colors. According to some embodiments, mixing two or more colors in the crowd control lighting system further encourages the crowd to disperse.

Figure 10:
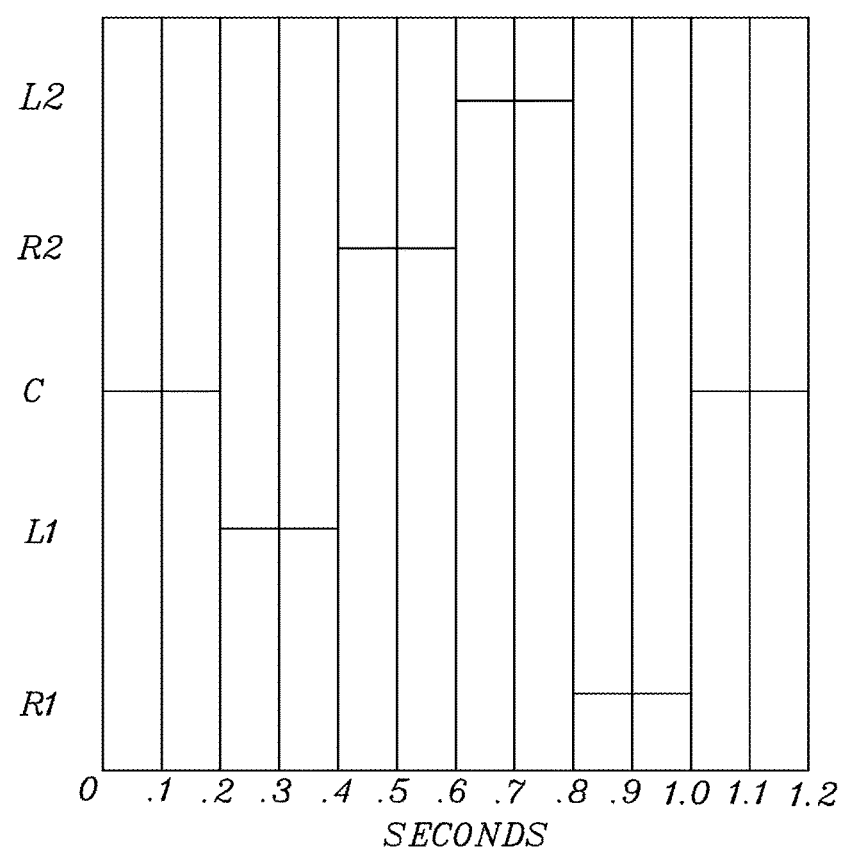
FIG. 10 is a diagram of alternate flashing waveforms of the five lighting devices of crowd control lighting system 60 according to some embodiments.

FIG. 10 is a second diagram of a plurality of flashing waveforms of crowd control lighting system 60 which according to some embodiments replaces the FIG. 9 illumination diagram.

The illumination waveforms of FIG. 10 provide continuous illumination of common illumination zone ZC because at every point in time—during every second—at least one of the five lights illuminate the common illumination zone ZC. According to some embodiments, the FIG. 10 illumination pattern minimizes shadows—when a law enforcement officer is viewing the crowd—because for each illuminating light to the left of center line CL there is a corresponding illuminating light to the right of centerline Cl. Persons within the crowd cannot accurately view or target law enforcement officers because all they see is a series of bursts of light coming from a variety of locations.

Lighting device 20 of FIG. 3 can be employed at all positions in crowd control lighting systems 50 and 60. According to some embodiments, crowd control lighting systems of the present disclosure can employ lighting devices having a different construction than lighting device 20 or employ different lighting devices at each position while using the concepts of the embodiments in the present disclosure.

According to some embodiments, crowd control lighting systems 50 and 60 both employ lighting device 20 at position center C. According to some embodiments the crowd control lighting system is constructed without a lighting device at position center C while still using the concepts of the embodiments in the present disclosure.

According to some embodiments, crowd control lighting system 50 is further configured to have periods of time during which all of the lights are extinguished thereby giving the eyes of persons in the crowd time to readjust to darkness before the crowd control lighting system resumes illumination. According to some embodiments, this dark zone with the period of time exceeding 5 seconds will encourage crowds to disperse.

Crowd control lighting systems 50 and 60 both employ lighting device 20 having a horizontal beam spread angle of 120° and a vertical beam spread angle of 20°. According to some embodiments of the present disclosure the lighting devices could have beam spreads of different magnitudes and still employ the concepts of the embodiments in the present disclosure.

According to some embodiments, the crowd control system is powered by any of a number of power sources including, but not limited to, line power, independent batteries, a vehicular charging system, vehicular rechargeable batteries etc.

One aspect of this description relates to a crowd control lighting system including a plurality of light emitting diode (LED) lights configured to emit a plurality of flashing directional light beams. Each of the lights is configured to emit a flashing directional light beam and each is supported by a base for directing the flashing directional light beam to illuminate a common illumination zone selectable from a plurality of illumination zones Another aspect of this description relates to a crowd control lighting system includes a wireless controller; and a plurality of light emitting diode (LED) lights configured to emit a plurality of flashing directional light beams having related illuminating waveforms determined by the wireless controller. The plurality of LED lights is separated by a distance and disposed to have the plurality of flashing directional light beams overlap at a common illumination zone.

Still another aspect of this description relates to a crowd control lighting system including a plurality of light emitting diode (LED) lights configured to emit a plurality of flashing directional light beams having related illuminating waveforms organized to continuously illuminate a common illumination zone The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A crowd control lighting system comprising:
a controller; and
a plurality of individual light emitting diode (LED) lighting devices each emitting a directional light beam configured by the controller to have a different illuminating waveform, wherein
said plurality of lighting devices is simultaneously positionable relative to a selectable common illumination zone with each of said plurality of lighting devices individually positionable at any one of a variety of selectable locations relative to said selectable common illumination zone to illuminate said common illumination zone, and
the illuminating waveforms are controlled by said controller to illuminate said common illumination zone at an illumination determined by said controller.

2. The crowd control lighting system according to claim 1, wherein the lighting devices illuminating the common illumination zone are additionally configured to effect a dark zone not directly illuminated by the plurality of directional light beams.

3. The crowd control lighting system according to claim 1, wherein the waveforms include at least one of a flashing waveform or a waveform having a plurality of intensities.

4. The crowd control lighting system according to claim 1, further comprising: a switch configured to select the waveform for at least one of the light beams.

5. The crowd control lighting system according to claim 1, wherein the illumination comprises a substantially constant intensity illumination.

6. The crowd control lighting system according to claim 1, wherein said controller is a wireless controller.

7. The crowd control lighting system according to claim 1, wherein the light beams are elongated in a horizontal direction and directed to overlap each other to illuminate said common illumination zone.

8. The crowd control lighting system according to claim 1, wherein each of said lighting devices is configured to be energized by a dedicated power source.

9. A crowd control lighting system comprising:
a controller, and
a plurality of individual light emitting diode (LED) lighting devices each emitting a directional light beam determined by the controller and including at least one of a flashing light or a light having a plurality of intensities, wherein
said plurality of lighting devices is simultaneously positionable relative to a selectable common illumination zone with each of said plurality of lighting devices individually positionable at any one of a variety of selectable locations relative to said selectable common illumination zone to illuminate said common illumination zone, and
the light beams are controlled by said controller to illuminate said common illumination zone at a substantially constant intensity.

10. The crowd control lighting system according to claim 9, further comprising: a switch configured to select a waveform for at least one of the light beams.

11. The crowd control lighting system according to claim 9, wherein the light beams have a color.

12. The crowd control lighting system according to claim 9, wherein the lighting devices positioned illuminating the common illumination zone additionally comprise an opaque housing to effect a dark zone not directly illuminated by the light beams.

13. The crowd control lighting system according to claim 9, wherein
each of the plurality of lighting devices is additionally positionable at tilt angles of at least 16 degrees about a centerline of the common illumination zone.

14. The crowd control lighting system according to claim 9, wherein the lighting devices are configured to emit the light beams having a beam spread angle exceeding 40° along a horizontal plane and the light beams overlap each other to illuminate the common illumination zone.

15. The crowd control lighting system according to claim 9, wherein the controller is a wireless controller.

16. The crowd control lighting system according to claim 9, wherein each of the lighting devices is configured to be energized by a dedicated power source.

17. A crowd control lighting system comprising:
a controller; and
a plurality of individual light emitting diode (LED) lighting devices each emitting a directional light beam determined by the controller and including at least one of a flashing light or a light having a plurality of intensities, wherein
the light beams are separated by a distance and directed to overlap each other in a common illumination zone to illuminate said common illumination zone,
the light beams are controlled by said controller to illuminate said common illumination zone at a substantially constant intensity,
said common illumination zone is selectable, and
the plurality of lighting devices is simultaneously positionable relative to the selectable common illumination zone with each of said plurality of lighting devices individually positionable at any one of a variety of selectable locations relative to said selectable common illumination zone to illuminate said selectable common illumination zone.

18. The crowd control lighting system according to claim 17, wherein the light beams have a color.

19. The crowd control lighting system according to claim 18, wherein
the lighting devices positioned illuminating the common illumination zone are additionally configured to effect a dark zone not illuminated by the light beams.

20. The crowd control lighting system according to claim 17, wherein the lighting devices are positioned on two sides of a centerline of the common illumination zone to minimize shadows within the common illumination zone.

21. The crowd control lighting system according to claim 17, wherein each of said plurality of directional light beams has an elongated beam pattern comprising a beam spread angle exceeding 40° in a horizontal plane and the light beams overlap each other to illuminate the common illumination zone.

22. The crowd control lighting system according to claim 17, wherein the controller includes a wireless controller.

23. The crowd control lighting system according to claim 17, wherein each of said lighting devices is configured to be energized by a dedicated power source.

24. The crowd control lighting system according to claim 17, wherein the light beams are elongated in a horizontal direction and directed to overlap each other to illuminate said common illumination zone.

25. A crowd control lighting system comprising:
a controller; and
a plurality of individual light emitting diode (LED) lighting devices each emitting a directional light beam determined by the controller and including at least one of a flashing light or a light having a plurality of intensities, wherein
the light beams are separated by a distance and directed to overlap each other in a common illumination zone to illuminate said common illumination zone,
the light beams are controlled by said controller to illuminate said common illumination zone at a substantially constant intensity, and
each of the plurality of lighting devices is additionally positionable at tilt angles of at least 16 degrees about a centerline of the common illumination zone.

* * * * *